W. F. DAGGETT.
LOOSE PULLEY.
APPLICATION FILED MAR. 20, 1916.
1,210,607.
Patented Jan. 2, 1917.
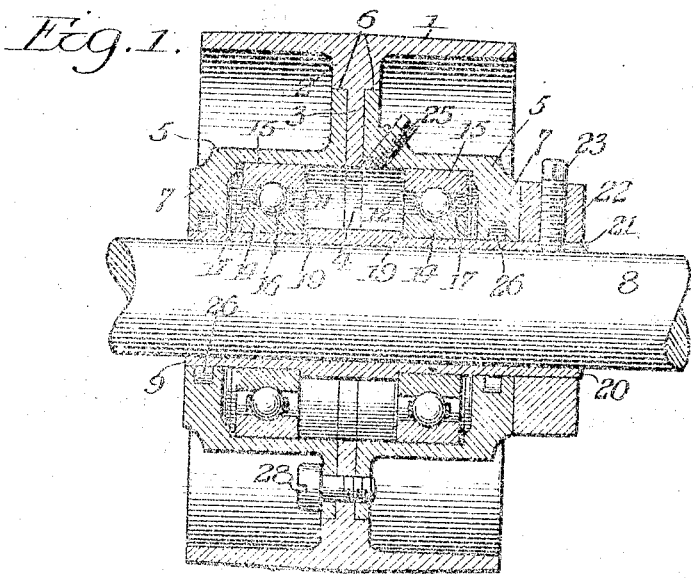
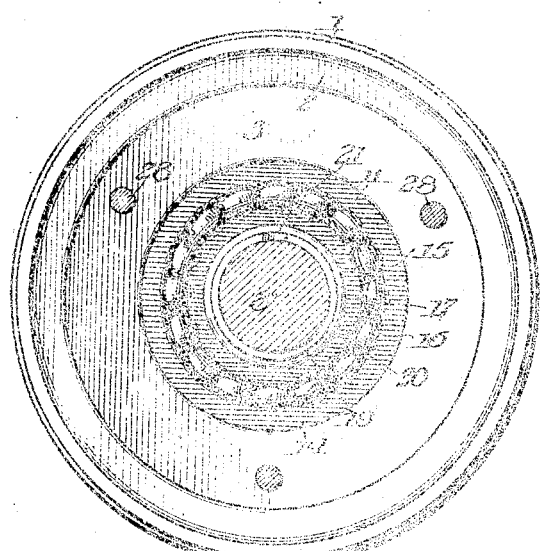
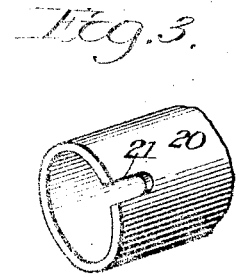
Inventor
William F. Daggett
by H. Miller Reyfield
Atty.

UNITED STATES PATENT OFFICE.

WILLIAM F. DAGGETT, OF CHICAGO, ILLINOIS.

LOOSE PULLEY.

1,210,607.     Specification of Letters Patent.     Patented Jan. 2, 1917.

Application filed March 20, 1916. Serial No. 85,286.

*To all whom it may concern:*

Be it known that I, WILLIAM F. DAGGETT, a citizen of the United States, residing at Chicago, in the county of Cook and State of Illinois, have invented a certain new and useful Improvement in Loose Pulleys, of which the following is a full, clear, concise, and exact description, reference being had to the accompanying drawings, forming a part of this specification.

My invention relates to loose pulleys and its principal object is to provide a simple and practical construction of loose pulley which shall reduce to a minimum the friction due to the rotation of the pulley.

In the accompanying drawings, Figure 1 is a cross section of a loose pulley involving my present invention; Fig. 2 is an end view with a right hand portion of the pulley, called a cup, removed; Fig. 3 is a view of a detail of construction.

In the drawings I show a pulley having a rim 1 and a centrally disposed, transversely extending web 2. This web 2 is preferably made integral with the rim 1 and has its inner or central portion reduced as shown at 3. The web has a central opening or aperture 4. On each side of the web 2 and fitted against the reduced portion 3 thereof are two side cups 5—5. These cups 5 have radially arranged web or flanged portions 6 which fit against the side faces of the central portion 3 of the flange 2, the web 2 and flanges 6 being machined so as to form a close and accurate fit with one another. The outer side or end portions 7 of the cups 5 extend radially inward and are formed with central apertures adapted to receive the shaft 8 on which the pulley is mounted. A sleeve 9 however, is fitted over the shaft 8 and inside of the apertures in the end portions 7 of said cups, said end portions 7 fitting loosely upon said sleeve 9. Within the cups 5 are mounted two ball bearing arrangements 11 and 12, each conveniently consisting of inner and outer ball race rings 14 and 15, respectively, and balls 16 between said ball race rings, said balls being arranged within side guard chains 17. The inner ball race rings 14—14 fit snugly upon the sleeve 9 and against abutments or shoulders 19 thereof. The outer ball race rings 15 fit against the inner surface of the cups 5 and rotate with said cups. The sleeve 9 is made of a length somewhat greater than the width of the pulley 1, so that an end portion 20 projects beyond one side of the pulley and this projecting end is provided with a slot 21. A collar 22 is preferably mounted on the projecting end 20 of the sleeve 9 and is provided with a screw 23 whose inner end can be inserted into the slot 21 and through the same so as to engage the shaft 8. In this way the sleeve or hub 9 may be in effect clamped or locked or otherwise made fast upon the shaft 8. The right hand cup 5 is shown provided with a screw 25 which passes through a suitable threaded aperture in said cup, said aperture opening into the central space or chamber formed by the two cups 5—5 and the central aperture 4 in the web portion 3. This central space or chamber is preferably provided with some lubricant such as vaseline or other grease for the lubrication of the ball bearings. This grease may be injected through the aperture in which the screw 25 fits and will find its way more or less through the ball bearings and into the small chambers at the outer sides of the same, and also into small annular chambers or recesses 26 formed in the end portions 7 of the cups 5. Bolts 28 are passed through the web portions 6 of the cups 5 and through the narrow portion 3 of the web 2 so as to hold said cups firmly in position. Thus it will be seen that the sleeve or hub 9 will be held firmly upon the shaft 8 and that the rim portion 1 may rotate relatively to the sleeve 9 by reason of the interposed ball bearing arrangements, the outer ball race rings 15 traveling with the rim 1 and web 2 and inner ball race rings 14 remaining fixed upon the sleeve 9. This affords a very efficient type of loose pulley. At the same time the construction is very simple, practical and inexpensive.

It will be understood that changes and modifications may be made without departing from the spirit of the invention.

What I claim is:

1. A loose pulley comprising relatively rotatable hub and rim portions, cup members between said portions, said cup members being fitted to the rim portion and rotating therewith and having central chamber portions forming a closed chamber, and ball bearing arrangements inclosed within said chamber of said cup members, said ball bearing arrangements being mounted upon said hub portion.

2. A loose pulley comprising relatively rotatable hub and rim portions, cup members between said portions, said cup members being fitted to the rim portion and rotating therewith and having central chamber portions, and ball bearing arrangements within the chamber portions of said cup members, said ball bearing arrangements being mounted upon said hub portion, said chamber portions of said cup members affording chambers or receptacles for lubricating material for said ball bearing arrangements.

3. A loose pulley comprising relatively rotatable hub and rim portions, cup members between said portions, said cup members being fitted to the rim portion and rotating therewith and having central chamber portions, and ball bearing arrangements within the chamber portions of said cup members, said ball bearing arrangements being mounted upon said hub portion, said rim portion having a transversely extending web located between said cup members, said cup members being fitted and secured to said web.

4. A loose pulley comprising relatively rotatable hub and rim portions, cup members between said portions, said cup members being fitted to the rim portion and rotating therewith and having central chamber portions, and ball bearing arrangements within the chamber portions of said cup members, said ball bearing arrangements being mounted upon said hub portion, said rim portion having a transversely extending web located between said cup members, said cup members being fitted and secured to said web, said web having a central aperture affording communication between said cup chambers.

5. A loose pulley comprising relatively rotatable hub and rim portions, cup members between said portions, said cup members being fitted to the rim portion and rotating therewith and having central chamber portions, and ball bearing arrangements within the chamber portions of said cup members, said ball bearing arrangements being mounted upon said hub portion, said rim portion having a transversely extending web located between said cup members, said cup members being fitted and secured to said web, said hub portion being formed by a sleeve adapted to fit within said cup members and also within said ball bearing arrangements and being provided with means for holding the latter in position.

6. A loose pulley comprising relatively rotatable hub and rim portions, cup members between said portions, said cup members being fitted to the rim portion and rotating therewith and having central chamber portions, and ball bearing arrangements within the chamber portions of said cup members, said ball bearing arrangements being mounted upon said hub portion, said rim portion having a transversely extending web located between said cup members, said cup members being fitted and secured to said web, said hub portion being formed by a sleeve adapted to fit within said cup members and also within said ball bearing arrangements and being provided with means for holding the latter in position, said sleeve being provided with a projecting end having a slot, a collar mounted on said projecting end and provided with a screw adapted to pass through said slot and engage said shaft.

7. A loose pulley comprising a rim portion having a transversely extending web provided with a central reduced portion having a centrally located aperture, cup members on opposite sides of said web, said cup members having flanges adapted to fit against the reduced portion of said web and also against the shoulders at the outer edge of said reduced portion, said cup members being hollow and having inwardly extending end portions provided with central apertures for a shaft, ball bearings arranged within said cup members, one ball bearing in each cup member at one side of said web, one of said cup members having an aperture affording communication between the outside of said cup member and the space within the same for the injection of a lubricant, a sleeve arranged within the cup members and fitting the apertures in the end portions of the same, said sleeve supporting said ball bearings and being provided with shoulders for engaging and holding the latter in position, bolts extending through the flanges of said cup members and also through said web so as to hold said cup members in position, and means for engaging said sleeve with a shaft passing through the same.

8. The combination with the cup members forming a closed chamber, of ball bearings arranged within and inclosed by said cup members.

9. The combination with the cup members forming a closed chamber, of ball bearings arranged within and inclosed by said cup members, and a sleeve arranged within said ball bearings.

10. The combination of a cup member having an internal annular chamber, a ball bearing arranged within said chamber, a sleeve within the ball bearing, and means for holding the cup member detachably in place over the ball bearing, said cup member being removable to permit the removal of said bearing.

In witness whereof, I hereunto subscribe my name this 10th day of March, A.D., 1916.

WILLIAM F. DAGGETT.

Witnesses:
A. LYDA JONES,
HAZEL A. JONES.